United States Patent [19]

Imai et al.

[11] Patent Number: 4,820,793

[45] Date of Patent: Apr. 11, 1989

[54] METHOD OF PREPARING AROMATIC POLYAMIDES AND POLYBENZOXAZOLES

[75] Inventors: Yoshio Imai, Tokyo; Masaaki Kakimoto, Yokohama; Yoshiyuki Oishi, Tokyo; Yutaka Maruyama, Kawasaki, all of Japan

[73] Assignee: Central Glass Company, Limited, Ube, Japan

[21] Appl. No.: 54,965

[22] Filed: May 28, 1987

[30] Foreign Application Priority Data

May 30, 1986 [JP] Japan ................... 61-125153
May 30, 1986 [JP] Japan ................... 61-125154

[51] Int. Cl.$^4$ ............................................. C08G 73/06
[52] U.S. Cl. ................................. 528/183; 528/26; 528/33; 528/38; 528/43; 528/185; 528/348

[58] Field of Search ............... 528/26, 183, 33, 38, 528/43, 185, 348

[56] References Cited

U.S. PATENT DOCUMENTS 4,423,202 12/1983 Choe .................................. 528/183

*Primary Examiner*—Harold D. Anderson
*Attorney, Agent, or Firm*—Fleit, Jacobson, Cohn & Price

[57] ABSTRACT

An aromatic polyamide of sufficiently high molecular weight is prepared by reacting a diphenyldiamino compound having a hydroxyl or siloxyl group in each phenyl group and a Si-containing substituent in each amino group, e.g. 2,2-bis(3-trimethylsilylamino-4-trimethylsiloxyphenyl) propane, with an aromatic dicarboxylic acid dihalide in an organic solvent. The polyamide can be converted into a polybenzoxazole by a dehydrating and cyclizing reaction at 100°–500° C.

16 Claims, No Drawings

METHOD OF PREPARING AROMATIC POLYAMIDES AND POLYBENZOXAZOLES

BACKGROUND OF THE INVENTION

This invention relates to a method of preparing a group of aromatic polyamides which are represented by the general formula (I) and which can be converted into corresponding polybenzoxazoles by appropriate heating:

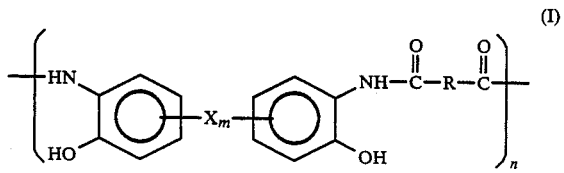

wherein X is a divalent organic group, m is 0 or 1, R is a divalent organic group, and n is an integer from 1 to 200. For example, the organic group X is —C(CH$_3$)$_2$— or —C(CF$_3$)$_2$—.

Aromatic polyamides represented by the general formula (I) are generally excellent in mechanical strength, heat resistance and dielectric characteristics and have uses as synthetic resins. Besides, by appropriate heating these aromatic polyamides undergo a dehydrating and cyclizing reaction and turn into corresponding polybenzoxazoles, which are promising as synthetic resins excellent in heat resistance, flame resistance, mechanical properties almost in every aspect and dielectric characteristics.

In general, aromatic polyamides are prepared by reacting an aromatic diamine compound with an aromatic dicarboxylic acid dihalide in an organic solvent. However, it is difficult to desirably control the degree of polymerization or molecular weight of the formed aromatic polyamides. Needless to mention, the properties of aromatic polyamides depend significantly on molecular weight. Aromatic polyamides not sufficiently high in molecular weight are insufficient in mechanical strength and heat resistance. Moreover, such aromatic polyamides are low in plasticity and in viscosity of their solutions and, therefore, can hardly be formed into films, fibers, etc. In respect of the aforementioned method of preparing aromatic polyamides, it is known that using equimolar quantities of the two reactants is effective for enhancing molecular weight of the formed polyamide, but in practice this theory applies only when the reactants are sufficiently high in reactivity. In the cases of preparing aromatic polyamides represented by the general formula (I), it has been difficult to obtain polyamides of sufficiently high molecular weight mainly because of low activities of aromatic diamines thus far used. Molecular weight of a polybenzoxazole derived from an aromatic polyamide is determined by the molecular weight of the polyamide, and the polybenzoxazole does not possess the aforementioned excellent properties when it is not sufficiently high in molecular weight.

SUMMARY OF THE INVENTION

It is an object of the present invention to provide a method of preparing aromatic polyamides which are represented by the general formula (I) and which can be made sufficiently high in molecular weight.

It is another object of the invention to provide a method of preparing polybenzoxazoles, which can be made sufficiently high in molecular weight, by first preparing an aromatic polyamide represented by the general formula (I) as an intermediate material.

According to the invention, an aromatic polyamide represented by the general formula (I) is prepared by reacting an aromatic diamine represented by the following general formula (II) with an aromatic dicarboxylic acid dihalide represented by the following general formula (III) in an organic solvent:

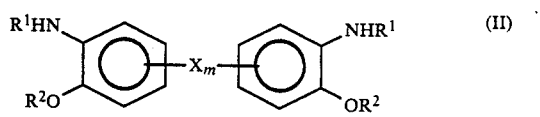

wherein $R^1$ is a monovalent organosilicon group, $R^2$ is a hydrogen atom or a monovalent organosilicon group, X is the divalent organic group in the general formula (I) and m is 0 or 1;

wherein R is the divalent aromatic group in the general formula (I), and Y is a halogen atom.

Furthermore, the invention provides a method of preparing a polybenzoxazole represented by the following general formula (IV), the method comprising the steps of preparing an aromatic polyamide represented by the general formula (I) by the above stated method according to the invention and heating the aromatic polyamide at a temperature in the range from about 100° C. to about 500° C.:

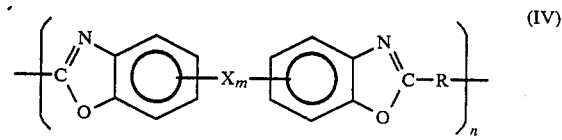

wherein X is the divalent organic group in the general formula (I), m is 0 or 1, R is the divalent aromatic group in the general formula (I), and n is an integer from 1 to 200.

The principal feature of the invention is using aromatic diamines represented by the general formula (I), which have silicon-containing substituents at least in their amino groups and are high in reactivity with aromatic dicarboxylic dihalides. Preferably the substituent group $R^1$ is an alkylsilyl group represented by trimethylsilyl group. Also it is preferable that $R^2$ is the same alkylsilyl group.

Molecular weight of an aromatic polyamide prepared by the method according to the invention depends largely on the proportion of the aromatic diamine to the aromatic dicarboxylic acid dihalide, and it is suitable to use equimolar quantities of these two reactants for preparing an aromatic polyamide of relatively high molecular weight.

Aromatic polyamides obtained by the method according to the invention are high in mechanical strength and also in heat resistance. Some of these polyamides are higher than 400° C. in decomposition temperature. These aromatic polyamides are soluble in many kinds of organic solvents and, therefore, can easily be formed into films or fibers and can be used as coating or painting materials.

Aromatic polyamides prepared by the method according to the invention have hydroxyl groups in their structural units and readily undergo a dehydrating and cyclizing reaction to turn into polybenzoxazoles which are excellent in mechanical properties and heat resistance.

DESCRIPTION OF THE PREFERRED EMBODIMENTS

In aromatic diamines represented by the general formula (II), and also in polyamides represented by the general formula (I) and polybenzoxazoles represented by the general formula (IV), the two phenyl groups may be bonded directly by a single bond (i.e. m in the formulas may be 0) or may be bridged by a divalent organic group X such as, for example, alkylene group, halogenated alkylene group, sulfo group, sulfide group, amino group, carbonyl group or ether group.

More particularly, preferable examples of the aromatic diamines are bis(3-trimethylsilylamino-4-trimethylsiloxyphenyl)methane, 1-phenyl-1,1-bis(3-trimethylsilylamino-4-trimethylsiloxyphenyl)ethane, 2,2-bis(3-trimethylsilylamino-4-trimethylsiloxyphenl)propane, 2,2-bis(3-trimethylsilylamino-4-trimethylsiloxyphenyl)hexafluoropropane, 1-phenyl-1,1-bis(3-trimethylsilylamino-4-trimethylsiloxyphenyl)trifluoroethane, 1-trifluoromethyl-1,1-bis(3-trimethyl-silylamino-4-trimethyl-siloxy)ethane, [4,4-bis(trimethylsilylamino)-3,3'-bis(trimethylsiloxy)]biphenyl, [3,3'-bis(trimethylsilylamino)-4,4'-bis(trimethylsiloxy)]biphenyl, bis(3-trimethylsilylamino-4-trimethylsiloxyphenyl)sulfone, bis(3-trimethylsilylamino-4-trimethylsiloxyphenyl)sulfide, bis(3-trimethylsilylamino-4-trimethylsiloxyphenyl)ether, bis(3-trimethylsilylamino-4-trimethylsiloxyphenyl)ketone and bis(3-trimethylsilylamino-4-trimethylsiloxyphenyl)amine.

As to aromatic dicarboxylic acid dihalides represented by the general formula (III), preferable examples are isophthalic acid dichloride, terephthalic acid dichloride, 4,4'-biphenyldicarboxylic acid dichloride, biphenylether4,4'-dicarboxylic acid dichloride, benzophenone-4,4'-dicarboxylic acid dichloride, benzosulfone-4,4'-dicarboxylic acid dichloride, isopropylidenebiphenyl-4,4'-dicarboxylic acid dichloride and hexafluoroisopropylidenebiphenyl4,4'-dicarboxylic acid dichloride. It is optional to use a mixture of two or more kinds of aromatic dicarboxylic acid dihalides to thereby obtain a copolymer as an aromatic polyamide to which the invention relates.

The reaction between the aromatic diamine and the aromatic dicarboxylic acid dihalide is carried out in an organic solvent, under substantially nonaqueous condition, at a temperature ranging from about $-10°$ C. to reflux temperature of the employed solvent. The reaction time is from several minutes to several hours. The organic solvent is not particularly limited, and wide selection can be made from, for example, amides such as N,N-dimethylformamide, N,N-dimethylacetamide, N-methyl-2-pyrrolidone and pyridine, sulfonic solvents such as dimethyl sulfoxide and tetramethyl sulfone, aromatic solvents such as benzene, toluene, anisol, diphenyl ether, nitrobenzene, benzonitrile, cresol and phenol and halogenated hydrocarbons such as chloroform, trichloroethane and carbon tetrachloride.

The conversion of an aromatic polyamide represented by the general formula (I) to a polybenzoxazole represented by the general formula (IV) is accomplished by a dehydrating and cyclizing reaction, which is per se known. This reaction is accomplished by heating the polyamide in a nonoxidizing atmosphere for a sufficient period of time, which may range from several seconds to tens of hours, at a temperature in the range from about 100° C. to about 500° C. It is optional to heat the polyamide in the presence of a dehydrating agent such as, for example, polyphosphoric acid with a view to accomplishing the dehydrating and cyclizing reaction at a relatively low temperature. Also it is possible to reduce the reaction temperature by carrying out the reaction under reduced pressure. In advance of this reaction the polyamide may be shaped into a desired form such as, for example, film or fiber. Then the polybenzoxazole is obtained in the same form.

The invention is further illustrated by the following nonlimitative examples.

EXAMPLE 1

In a 50 ml three-necked flask, 1.638 g (2.5 millimol) of 2,2-bis(3-trimethylsilylamino-4-trimethylsiloxyphenyl)-hexafluoropropane was dissolved in 5 ml of dimethylacetamide by stirring in a nitrogen gas atmosphere. The solution was freezed by using a bath of dry ice and acetone, and then 0.508 g (2.5 millimol) of isophthalic acid dichloride was put into the flask. After that the bath was changed to an ice bath, and gentle stirring was commenced to cause the freezed solution to gradually melt. The stirring was continued for 5 hr while maintaining a nitrogen gas atmosphere in the flask. After that the reaction liquid was poured into a large quantity of water to precipitate a polymer.

The intrinsic viscosity of the obtained polymer was 0.64 (0.5 g/dl in dimethylacetamide, at 30° C.) By infrared absorption spectrum analysis the polymer exhibited absorptions at 1600 cm$^{-1}$ (N—H) and 1650 cm$^{-1}$ (C=O). Elementary analysis of the polymer gave the following result.

Calculated (%):C, 55.66, H, 2.84, N, 5.64.
Found (%): C, 55.44, H, 2.68, N, 5.88.

Therefore, the obtained polymer was confirmed to be a polyamide represented by the following formula (1).

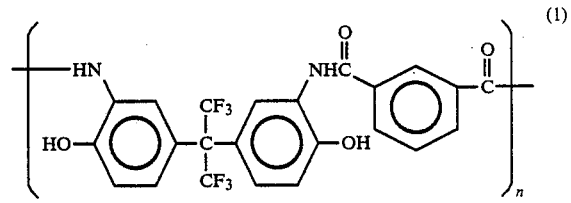

EXAMPLE 2

The polyamide prepared in Example 1 was dissolved in N-methyl-2-pyrrolidone, and the solution was spread on a glass plate followed by evaporation of the solvent to thereby form a coating film. Then the glass plate was heated in a nitrogen gas stream at 280°-300° C. for 10 hr to cure the coating film of the polyamide into a transparent and tough film. Infrared absorption spectrum of the cured polymer film exhibited an absorption peak at 1620 cm$^{-1}$ (C=N) Elementary analysis of this polymer film gave the following result.

Calculated (%):C, 60.01, H, 2.19, N, 6.08.

Found (%):C, 59.94, H, 2.03, N, 6.17.

Therefore, the polymer obtained by the heat treatment was confirmed to be a polybenzoxazole represented by the following formula (2).

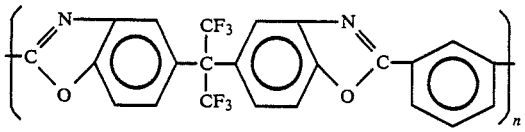

COMPARATIVE EXAMPLE 1

By the same method and under the same conditions as in Example 1, 0.915 g (2.5 millimol) of 2,2-bis(3-amino-4-hydroxyphenyl)hexafluoropropane was reacted with 0.508 g (2.5 millimol) of isophthalic acid dichloride to synthesize a polyamide.

The intrinsic viscosity of the obtained polymer was 0.08 (0.5 g/dl in dimethylacetamide, at 30° C.) Infrared absorption spectrum of the polymer indicated the existence of N—H (1600 $cm^{-1}$) and C=O (1650 $cm^{-1}$). Elementary analysis gave the following result.

Calculated (%):C, 55.66, H, 2.84, N, 5.64.
Found (%):C 55.40, H, 2.61, N, 5.78.

This polymer was confirmed to be a polyamide represented by the above formula (1), though it was very lower in molecular weight than the polyamide obtained in Example 1.

COMPARATIVE EXAMPLE 2

Using the polyamide obtained in Comparative Example 1, the coating operation and the subsequent heat treatment described in Example 2 were carried out in the same manner. However, in this case it was impossible to obtain a polybenzoxazole in film form. Though the polyamide was converted to the polybenzoxazole represented by the above formula (2), the product was in the form of powder. Elementary analysis of the obtained polybenzoxazole gave the following result.

Calculated (%):C, 60.01, H, 2.19, N, 6.08.
Found (%):C, 60.13, H, 2.26, N, 6.31.

EXAMPLE 3

By the same method as in Example 1, 1.638 g (2.5 millimol) of 2,2-bis(3-trimethylsilylamino-4-trimethylsiloxyphenyl)hexafluoropropane was reacted with 0.508 g (2.5 millimol) of terephthalic acid dichloride to synthesize a polyamide. The intrinsic viscosity of the obtained polymer was 0.65 (0.5 9/dl in dimethylacetamide, at 30° C.) The polymer exhibited infrared absorption peaks at 1600 $cm^{-1}$ (N—H) and 1650 $cm^{-1}$ (C=O). Elementary analysis of the polymer gave the following result.

Calculated (%):C, 55.66, H, 2.84, N, 5.64.
Found (%):C, 55.41, H, 2.77, N, 5.95.

Therefore, the obtained polymer was confirmed to be a polyamide represented by the following formula (3).

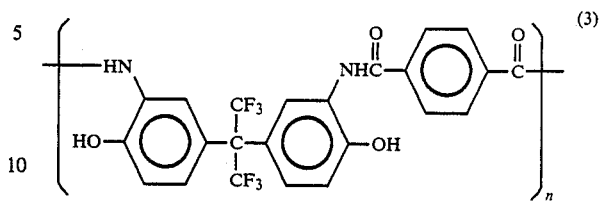

EXAMPLE 4

A film of the polyamide prepared in Example 3 was formed by the same method as in Example 2, and the film was cured by the heat treatment described in Example 2. After curing the film was transparent and tough.

The cured polymer film exhibited infrared absorption at 1620 $cm^{-1}$ (C=N) Elementary analysis of the polymer film gave the following result.

Calculated (%):C, 60.01, H, 2.19, N, 6.08.
Found (%):C, 59.81, H, 2.14, N, 6.25.

Therefore, the polymer obtained by the heat treatment was confirmed to be a polybenzoxazole represented by the following formula (4).

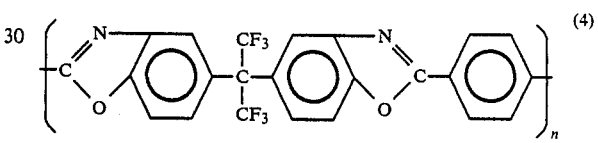

EXAMPLE 5 as in Example 1, 1.638 g (2.5 millimol) of 2,2-bis(3-trimethylsilylamino-4-trimethylsiloxyphenyl)hexafluoropropane was reacted with a mixture of 0.254 g (1.25 millimol) of isophthalic acid dichloride and 0.254 g (1.25 millimol) of terephthalic acid dichloride to synthesize a polyamide.

The intrinsic viscosity of the obtained polymer was 0.86 (0.5 g/dl in dimethylacetamide, at 30° C.). The polymer exhibited infrared absorption peaks at 1600 $cm^{-1}$ (N—H) and 1650 $cm^{-1}$ (C=O) Elementary analysis of the polymer gave the following result.

Calculated (%):C, 55.66, H, 2.84, N, 5.64.
Found (%):C, 55.47, H, 2.67, N, 5.96.

Therefore, the obtained polymer was confirmed to be a polyamide represented by the following formula (5).

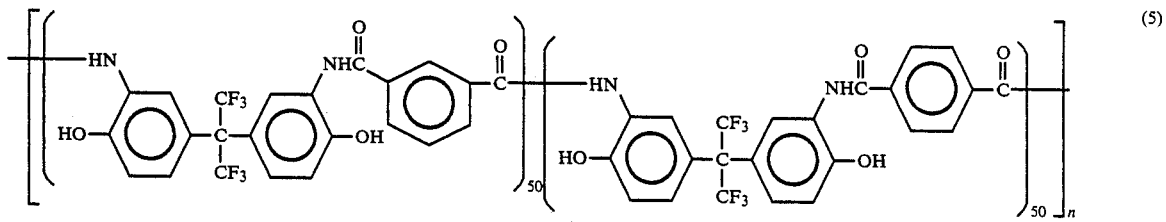

EXAMPLE 6

A film of the polyamide prepared in Example 5 was formed and heat-treated in the same manner as in Example 2. After the heat treatment the polymer film was transparent and tough.

The heat-treated polymer film exhibited infrared absorption at 1620 cm$^{-1}$ (C≡N). Elementary analysis of the polymer film gave the following result.
Calculated (%):C, 60.01, H, 2.19, N, 6.08.
Found (%):C, 60.02, H, 2.05, N, 6.30.
Therefore, the polymer obtained by the heat treatment was confirmed to be a polybenzoxazole represented by the following formula (6).

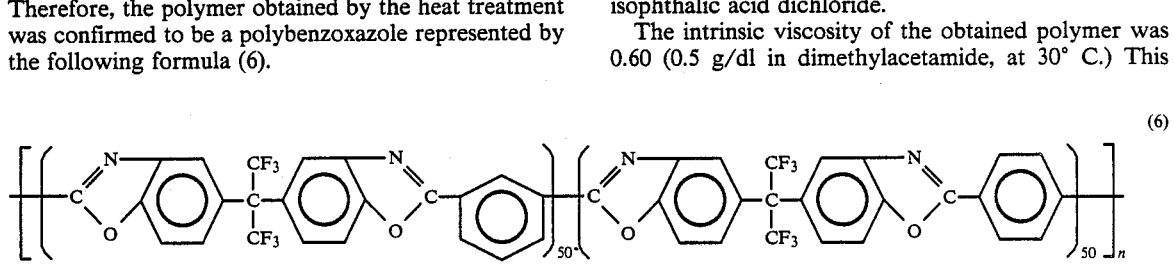
(6)

EXAMPLE 7

The synthesis process of Example 1 was repeated except that 0.737 g (2.5 millimol) of biphenylether4,4'-dicarboxylic acid dichloride was used in place of isophthalic acid dichloride.

The intrinsic viscosity of the obtained polymer was 0.47 (0.5 g/dl in dimethylacetamide, at 30° C.) This polymer was a polyamide represented by the following formula (7). Infrared absorption spectrum ndicated existence of N—H (1600 cm$^{-1}$) and C═O (1650 cm$^{-1}$) Elementary analysis gave the following result.
Calculated (%):C, 59.19, H, 3.08, N, 4.76.
Found (%):C, 59.13, H, 3.02, N, 4.75.

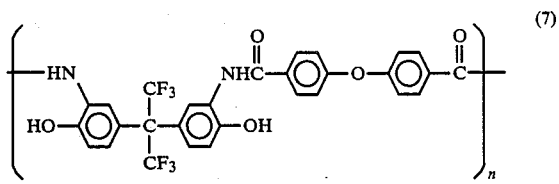
(7)

EXAMPLE 8

A film of the polyamide prepared in Example 7 was formed and heat-treated in the same manner as in Example 2. After the heat treatment the polymer film was transparent and tough.

The polymer obtained by the heat treatment was a polybenzoxazole represented by the following general formula (8). Infrared absorption spectrum indicated the existence of C═N (1620 cm$^{-1}$) Elementary analysis gave the following result.

Calculated (%):C, 63.05, H, 2.55, N, 5.07.
Found (%):C, 62.85, H, 2.52, N, 5.17.

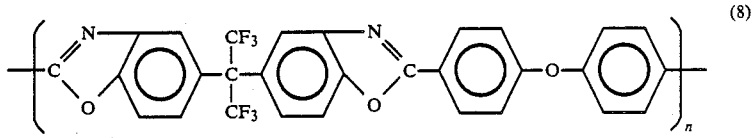
(8)

EXAMPLE 9

The synthesis process of Example 1 was repeated except that 0.633 g (2.5 millimol) of 2,6-naphthalenedicarboxylic acid dichloride was used in place of isophthalic acid dichloride.

The intrinsic viscosity of the obtained polymer was 0.60 (0.5 g/dl in dimethylacetamide, at 30° C.) This polymer was a polyamide represented by the following formula (9). Infrared absorption spectrum indicated the existence of N—H (1600 cm$^{-1}$) and C═O (1650 cm$^{-1}$) Elementary analysis gave the following result.
Calculated (%):C, 59.35, H, 2.95, N, 5.13.
Found (%):C, 59.19, H, 2.94, N, 5.27.

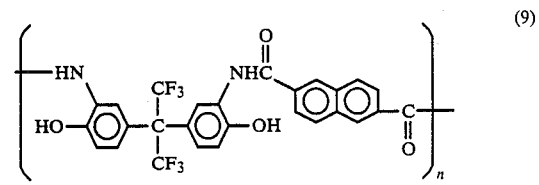
(9)

EXAMPLE 10

A film of the polyamide prepared in Example 9 was formed and heat-treated in the same manner as in Example 2. After the heat treatment the polymer film was transpaent and tough.

The polymer obtained by the heat treatment was a polybenzoxazole represented by the following formula (10). Infrared absorption spectrum indicated the existence of C═N (1620 cm$^{-1}$) Elementary analysis gave the following result.
Calculated (%):C, 63.54, H, 2.37, N, 5.49.
Found (%):C, 63.52, H, 2.33, N, 5.45.

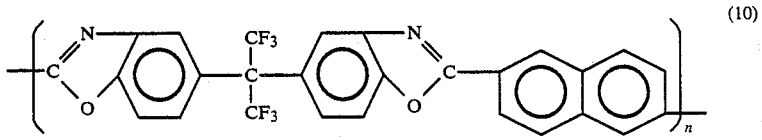
(10)

EXAMPLE 11

The synthesis process of Example 1 was repeated except that 1.073 g (2.5 millimol) of hexafluoro isopropylidenebiphenyl-4,4'-dicarboxylic acid dichloride was used in place of isophthalic acid dichloride.

The intrinsic viscosity of the obtained polymer was 0.40 (0.5 g/dl in dimethylacetamide, at 30° C.) This polymer was a polyamide represented by the following formula (11). Infrared absorption spectrum indicated the existence of N—H (1600 cm$^{-1}$) and C=O (1650 cm$^{-1}$). Elementary analysis gave the following result.

Calculated (%):C, 53.20, H, 2.51, N, 3.88.
Found (%):C, 53.18, H, 2.37, N, 3.91.

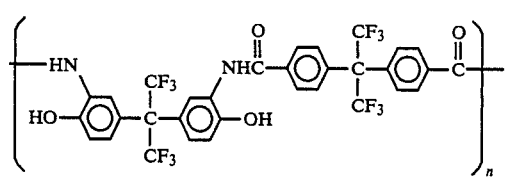

EXAMPLE 12

A film of the polyamide prepared in Example 11 was formed and heat-treated in the same manner as in Example 2. After the heat treatment the polymer film was transparent and tough.

The polymer obtained by the heat treatment was a polybenzoxazole represented by the following formula (12). Infrared absorption spectrum indicated the existence of C=N (1620 cm$^{-1}$). Elementary analysis gave the following result.

Calculated (%):C, 55.99, H, 2 06, N, 4.08.
Found (%1 C, 55.86, H, 1.98, N, 4.07.

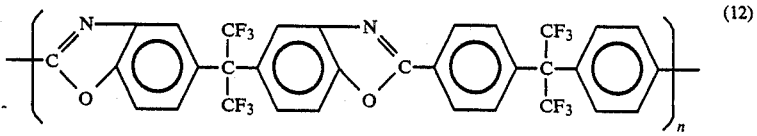

EXAMPLE 13

By the same method as in Example 1, 1.368 g (2.5 millimol) of 2,2 bis(3-trimethylsilylamino-4-trimethylsiloxyphenyl)propane was reacted with 0.508 g (2.5 millimol) of isophthalic acid dichloride to synthesize a polyamide.

The intrinsic viscosity of the obtained polymer was 0.55 (0.5 g/dl in dimethylacetamide, at 30° C.) This polymer was a polyamide represented by the following formula (13). Infrared absorption spectrum indicated the existence of N—H (1600 cm$^{-1}$) and C=O (1650 cm$^{-1}$) Elementary analysis gave the following result.

Calculated (%):C, 71.12, H, 5.19, N, 7.21.
Found (%):C, 71.34, H, 5.42, N, 7.55.

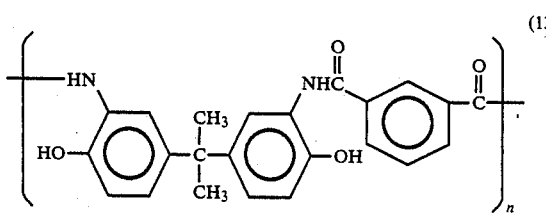

EXAMPLE 14

A film of the polyamide prepared in Example 13 was formed and heat-treated in the same manner as in Example 2. After the heat treatment the polymer film was transparent and tough.

The polymer obtained by the heat treatment was a polybenzoxazole represented by the formula (14). Infrared absorption spectrum indicated the existence of C=N (1620 cm$^{-1}$) Elementary analysis gave the following result.

Calculated (%):C, 78.39, H, 4.58, N, 7.95.
Found (%):C, 78.62, H, 4.73, N, 7.92.

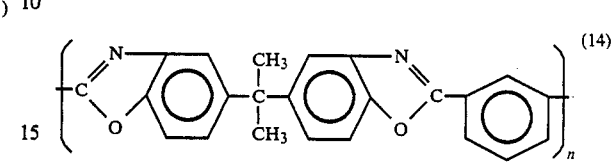

EXAMPLE 15

By the same method as in Example 1, 1.262 g (2.5 millimol) of [4,4-bis(trimethylsilylamino)-3,3'-bis(trimethylsiloxy)]biphenyl was reacted with 0.508 g (2.5 millimol) of isophthalic acid dichloride to synthesize a polyamide.

The intrinsic viscosity of the obtained polymer was 0.50 (0.5 g/dl in dimethylacetamide, at 30° C.) This polymer was a polyamide represented by the following formula (15). Infrared absorption spectrum indicted the existence of N—H (1600 cm$^{-1}$) and C=O (1650 cm$^{-1}$) Elementary analysis gave the following result.

Calculated (%):C, 69.34, H, 4.07, N, 8.09.
Found (%):C, 69.06, H, 4.06, N, 6.25.

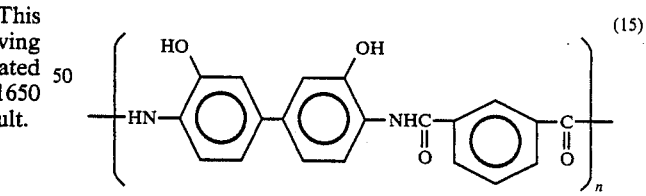

EXAMPLE 16

A film of the polyamide prepared in Example 15 was formed and heat-treated in the same manner as in Example 2. After the heat treatment the polymer film was transparent and tough.

The polymer obtained by the heat treatment was a polybenzoxazole represented by the following formula (16). Infrared absorption spectrum indicated the existence of C=N (1620 cm$^{-1}$) Elementary analysis gave the following result.

Calculated (%):C, 77.41, H, 3.25, N, 9.03.
Found (%):C, 77.20, H, 3.57, N, 9.19.

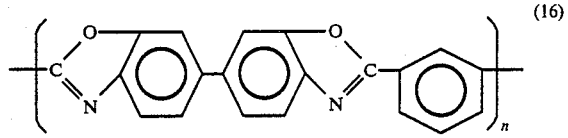

(16)

What is claimed is:

1. A method of preparing an aromatic polyamide represented by the general formula (I), comprising the step of reacting an aromatic diamine represented by the general formula (II) with an aromatic dicarboxylic acid dihalide represented by the general formula (III) in an organic solvent:

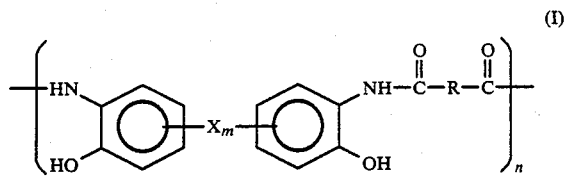

(I)

wherein X is a divalent organic group, m is 0 or 1, R is a divalent aromatic group, and n is an integer from 1 to 200;

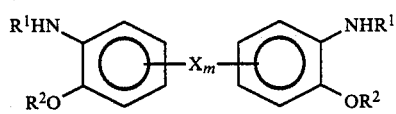

(II)

wherein $R^1$ is a monovalent organosilicon group, $R^2$ is a monovalent organosilicon group, X is said divalent organic group, and m is 0 or 1;

(III)

wherein R is said divalent aromatic group, and Y is a halogen atom.

2. A method according to claim 1, wherein said X represents $-C(CH_3)_2-$.

3. A method according to claim 1, wherein said X represents $-C(CF_3)_2-$.

4. A method according to claim 1, wherein said $R^1$ is an alkylsilyl group.

5. A method according to claim 4, wherein said $R^2$ is an alkylsilyl group.

6. A method according to claim 1, wherein said aromatic diamine is selected from the group consisting of bis(3-trimethylsilylamino-4-trimethylsiloxyphenyl)methane, 1-phenyl-1,1-bis(3-trimethylsilylamino-4-trimethylsiloxyphenyl)ethane, 2,2-bis(3-trimethylsilylamino-4-trimethylsiloxyphenyl)propane, 2,2-bis(3-trimethylsilylamino-4-trimethylsiloxyphenyl)hexafluoropropane, 1-phenyl-1,1-bis(3-trimethylsilylamino-4-trimethylsiloxyphenyl)trifluoroethane, 1-trifluoromethyl-1,1-bis(3-trimethylsilylamino-4-trimethylsiloxy)ethane, [4,4-bis-(trimethylsilylamino)-3,3'-bis(trimethylsiloxy)]-biphenyl, [3,3'-bis(trimethylsilylamino)-4,4'-bis(trimethylsiloxy)]biphenyl, bis(3-trimethylsilyl-amino-4-trimethylsiloxyphenyl)sulfone, bis(3-trimethylsilylamino-4-trimethylsiloxyphenyl)sulfide, bis(3-trimethylsilylamino-4-trimethylsiloxyphenyl)ether, bis(3-trimethylsilylamino-4-trimethylsiloxyphenyl)ketone and bis(3-trimethylsilylamino-4-trimethylsiloxyphenyl)amine.

7. A method according to claim 1, wherein said aromatic dicarboxylic acid dihalide is a dihalide of an acid selected from the group consisting of isophthalic acid, terephthalic acid, 4,4'-biphenyldicarboxylic acid, biphenylether-4,4'-dicarboxylic acid, benzophenone-4,4'-dicarboxylic acid, biphenylether-4,4'-dicarboxylic acid, benzophenone-4,4'dicarboxylic acid, benzosulfone-4,4'-dicarboxylic acid, isopropylidenebiphenyl-4,4'-dicarboxylic acid and hexafluoroisopropylidenebiphenyl-4,4'dicarboxylic acid.

8. A method according to claim 7, wherein said dihalide is dichloride.

9. A method according to claim 1, wherein the proportion of said aromatic diamine to said aromatic dicarboxylic acid dihalide is approximately 1:1 by mol.

10. A method of preparing a polybenzoxazole represented by the general formula (IV),

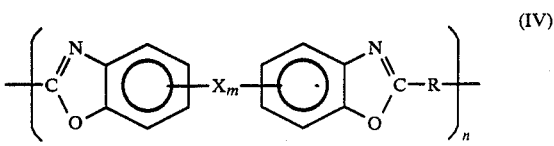

(IV)

wherein X is a divalent organic group, m is 0 or 1, R is a divalent aromatic group, and n is an integer from 1 to 200, the method comprising the steps of:
reacting an aromatic diamine represented by the general formula (II) with an aromatic dicarboxylic acid dihalide represented by the general formula (III) to thereby form an aromatic polyamide represented by the general formula (I); and
heating said aromatic polyamide at a temperature in the range from about 100° C. to about 500° C.;

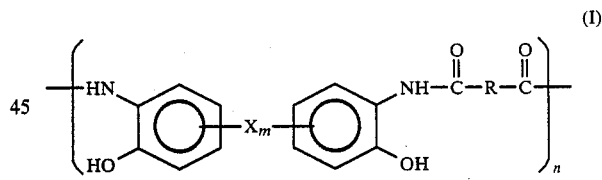

(I)

wherein X is said divalent organic group, m is 0 or wherein 1, R is said divalent aromatic group, and n is an integer from 1 to 200;

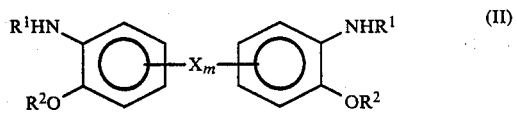

(II)

wherein $R^1$ is a monovalent organosilicon group, $R^2$ is a monovalent organosilicon group, X is said divalent organic group, and m is 0 or 1;

(III)

wherein R is said divalent aromatic group, and Y is a halogen atom.

11. A method according to claim 10, wherein the heating of said aromatic polyamide is performed in the presence of a dehydrating agent.

12. A method according to claim 10, wherein said X represents $-C(CH_3)_2-$.

13. A method according to claim 10, wherein said X represents $-C(CF_3)_2-$.

14. A method according to claim 10, wherein said $R^1$ is an alkylsilyl group.

15. A method according to claim 14, wherein said alkylsilyl group is trimethylsilyl group.

16. A method according to claim 14, wherein said $R^2$ is an alkylsilyl group.

* * * * *